Nov. 5, 1957 R. J. PHELPS 2,812,509

PRIVATE LINE SYSTEM

Filed Aug. 31, 1953 4 Sheets-Sheet 1

INVENTOR

RICHARD J. PHELPS

BY Thomas M. Ferrill, Jr.

ATTORNEY

PRIVATE LINE SYSTEM

Filed Aug. 31, 1953 4 Sheets-Sheet 2

INVENTOR
RICHARD J. PHELPS
BY
Thomas M. Ferrill, Jr.
ATTORNEY

INVENTOR
RICHARD J. PHELPS
BY
Thomas M. Ferrill, Jr.
ATTORNEY

INVENTOR
RICHARD J. PHELPS
BY
Thomas M. Ferrill, Jr.
ATTORNEY

United States Patent Office 2,812,509

Patented Nov. 5, 1957

2,812,509

PRIVATE LINE SYSTEM

Richard J. Phelps, Rockville Centre, N. Y., assignor to Sperry Rand Corporation, a corporation of Delaware Application August 31, 1953, Serial No. 377,357

7 Claims. (Cl. 340—147)

This invention relates to improvements in selective communication systems of the type including a transmitter station linked to a plurality of receiver stations by way of a single communication channel, such as a radio frequency carrier, and means for selecting exclusively any one of said receiver stations to respond to a transmitted message.

It has been proposed heretofore to effect such selection by transmitting calling signals which are coded so as to characterize the particular receiver for which a message is intended. The message utilization means (e. g. indicator or recorder) at each receiver station is normally disconnected or cut off; when the calling signal characteristic of a station is received, the utilization means at that station is enabled thereby to respond to the message.

The principal object of this invention is to provide improvements in "address selectors," or calling systems for communication networks of the above described type.

Specifically, it is an object to provide an address selector system which is simple in construction and operation, and readily adaptable to handle substantially any desired number of receiver stations without undue complication of equipment.

Another object is to provide an address selector which is rapid and dependable, and does not require any critically adjusted circuit elements or special electron tubes.

In the embodiment of the invention described in detail hereinafter, the calling or address selection signal consists of a relatively long pulse which serves as a "general attention" signal, followed by a sequence of relatively short pulses coded to designate the receiver station being called. The short pulses are arranged in groups corresponding to binary numbers, each of said numbers representing one of the digits of a decimal number which is the call number assigned to a particular receiver station. With this arrangement, the address selector utilizes components, techniques, and circuits of the type used in digital computers, and thereby achieves the advantages of high speed and accuracy, as well as compatibility with message transmission systems of the pulse code modulation type.

Figures 1, 2:
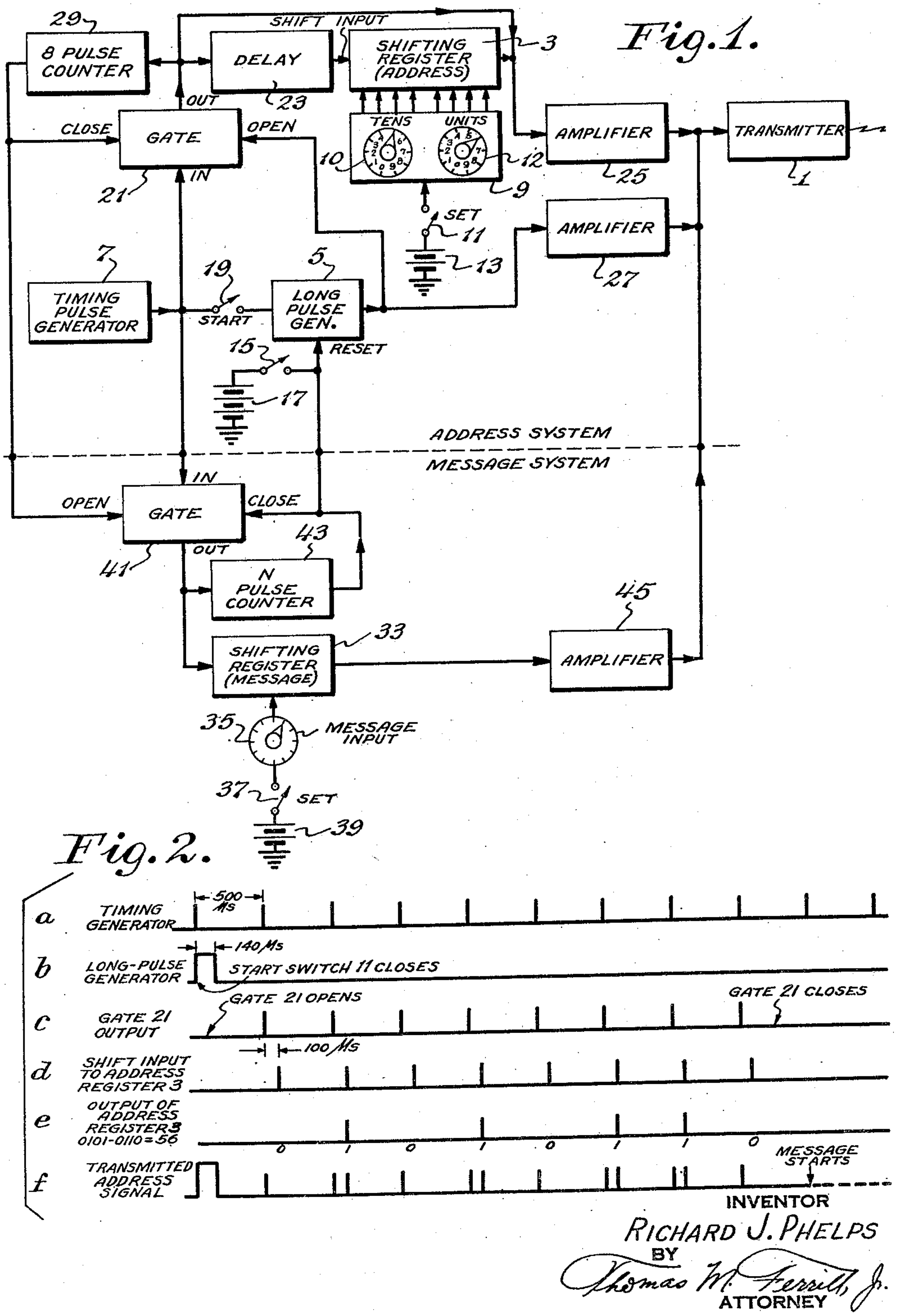
Figures 3, 4:
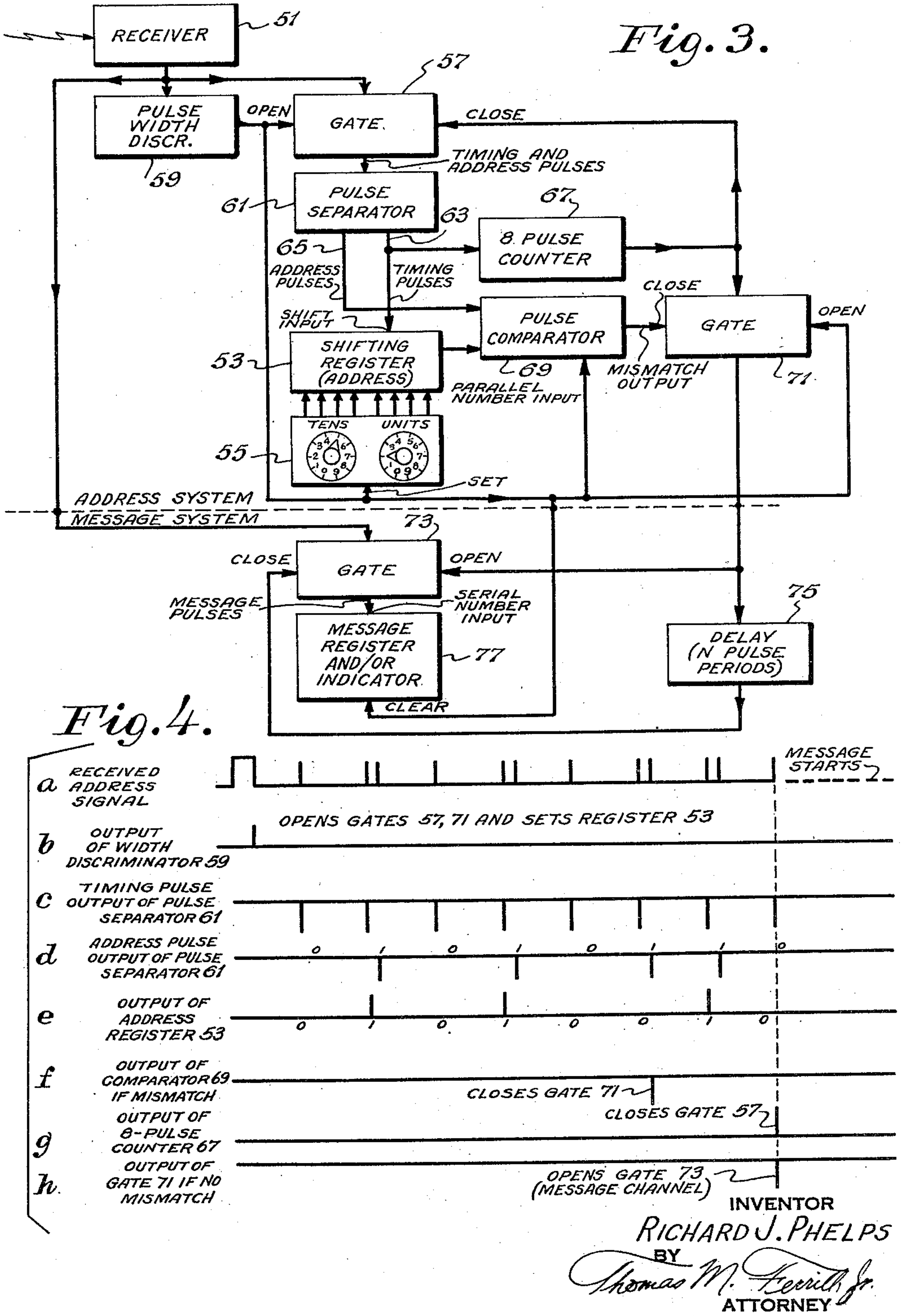
Figures 5, 7:
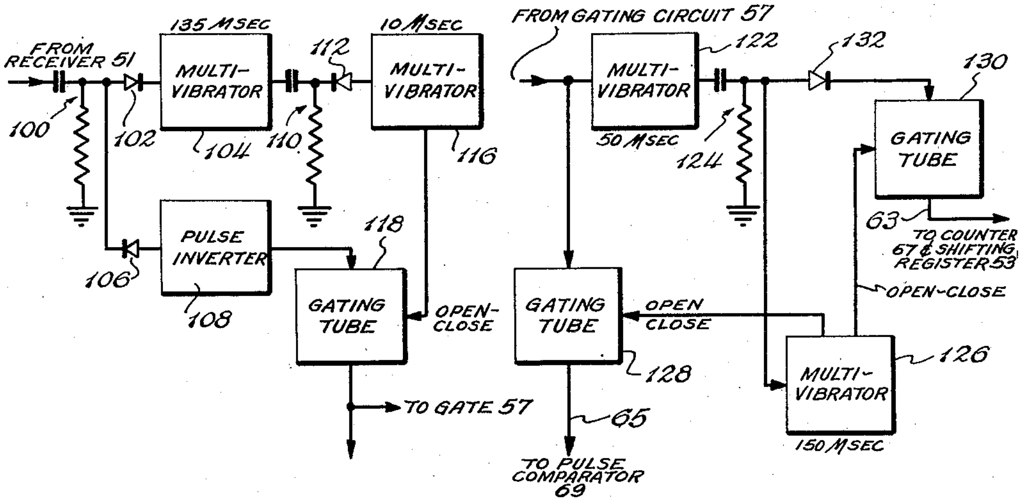
Figure 9:
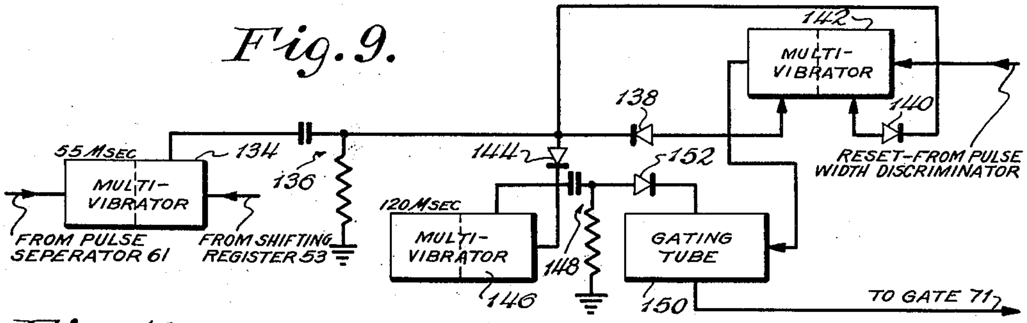
Figure 11:
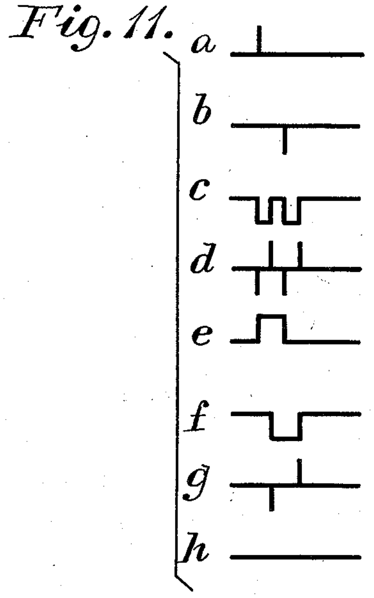
Figure 12:
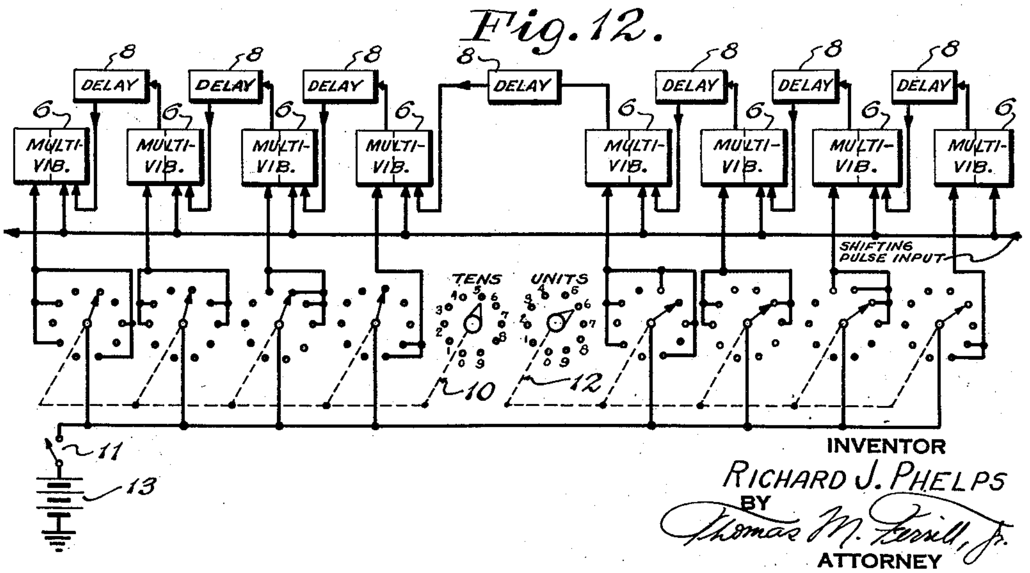

The invention will be described with reference to the accompanying drawings, wherein:

Fig. 1 is a schematic block diagram of a transmitter station, including an address system embodying the present invention;

Figs. 2*a–f* are a series of graphs representing typical signals produced in the operation of the system of Fig. 1;

Fig. 3 is a schematic block diagram of a receiver station including an address system embodying the present invention;

Figs. 4*a–h* are a series of graphs representing typical signals produced in the operation of the system of Fig. 3;

Fig. 5 is a schematic block diagram of the pulse width discriminator circuit of the receiver station;

Figs. 6*a–f* are a series of graphs used in explaining the operation of the circuit of Fig. 5;

Fig. 7 is a schematic block diagram of the pulse separation circuit of the receiver station;

Figs. 8*a–g* are a series of graphs used in explaining the operation of the circuit of Fig. 7;

Fig. 9 is a schematic block diagram of the pulse comparator circuit of the receiver station;

Figs. 10*a–h* and Figs. 11*a–h* are a series of graphs used in explaining the operation of the circuit of Fig. 9; and Fig. 12 is a schematic block diagram of the shifting register used in both the transmitting and receiving stations.

Referring to Fig. 1, the transmitter station equipment includes the address system, shown in the upper part of Fig. 1, and the message system in the lower part of Fig. 1, both coupled to a radio transmitter 1. The address system includes an address shifting register 3, a non-repetitive long pulse generator 5, a repetitive timing pulse generator 7, and control circuits interconnecting said elements so as to produce, prior to transmission of a message, a single long pulse followed by a predetermined sequence of address pulses.

The address register 3, as shown schematically in Fig. 12, may be a cascaded series of bi-stable multivibrators 6 or Eccles-Jordon circuits, each having two stable conditions which may be designated as 0 and 1 respectively. These multivibrators are connected by means of delay networks 8. A "shifting pulse" applied to the register momentarily sets each multivibrator in the 0 condition. All stages previously in the 1 condition simultaneously produce an output pulse; those previously in the 0 condition are of course unaffected by the shifting pulse. The output pulses of the stages shifted from the 1 condition to the 0 condition are passed on to the next stage through delay networks 8, so that the shifting pulse in effect transfers the condition of each stage to the next stage, each shift causing the final stage to produce an output pulse when it is in the 1 condition, but no output when it is in the 0 condition. Each shift leaves a successive stage, starting with the first one, at 0. In the present example, the register 3 consists of eight such stages in order to accommodate addresses from 1 to 99, i. e. two decimal digits.

Connections are brought out separately from each stage to an address input device 9 which comprises a set of ten-position four pole selector switches 10 and 12 connected through a momentary contact switch 11 to D. C. source 13. The selector switches are connected to the several stages of the register in such manner that when the "set" switch 11 is closed, selected stages are supplied through the switches with a voltage which presets the respective stages to 1, so that a predetermined pattern, depending on the number to which the two selector switches 10 and 12 are set, is established on the register.

The last four stages are set in inverse order so that the pulses are fed out of the shifting register in a forward sequence according to the binary representation of the first digit of the selected call signal. For example, if the call signal is to be fifty-six, the first digit is five, and the last four stages are set as follows: 0, 1, 0, 1. Similarly, the first four stages are set in inverse order in accordance with the second digit six: 0, 1, 1, 0. Actually, as will become apparent, the above described inverse order is not essential, since the receiver system may be designed to accept and respond to the address pulses in any predetermined order.

The timing pulse generator 7 may include a blocking oscillator and/or other circuits known in the art, designed to produce pulses with a duration of the order of ten microseconds and a repetition period of 500 microseconds, for example. The long pulse generator 5 may comprise a monostable multivibrator arranged to be triggered by a bistable multivibrator so as to produce a single relatively long output pulse in response to the first of a series of input pulses, and then remain inactive until it has been reset. In the present example, the device 5 is designed to produce a pulse of 140 microseconds' duration.

The long pulse generator 5 may be set or prepared for operation by momentarily applying a D.-C. voltage to its "reset" terminal. This may be effected by means of a switch 15 and a D.-C. source 17, or the generator 5 may be reset automatically at the conclusion of each message transmission, as will be described. The trigger input terminal of the long pulse generator is connected to the timing pulse generator 7 through a "start" switch 19, which may be a push-button or other momentary contact type of switch.

The output of the timing pulse generator 7 goes to the input terminal of a gate 21. This gate, as well as the other gates in the present system, generally has two control terminals: one to "open" it, i. e. make it conductive so that a pulse applied to its input terminal will appear at its output terminal, and the other to close it. The gate is designed to remain in its last actuated state, either open or closed, until it is operated to the other state by application of a pulse to the proper control terminal. By way of example, the gate may consist of a gating tube having two control electrodes, one connected to the input terminal and the other connected to a bistable multivibrator circuit so that when the multivibrator is in one condition the tube is biased to cutoff, and when the multivibrator is in the other condition, the cutoff bias is removed or neutralized and the tube can conduct. The control input terminals of the gate may be connected to the respective multivibrator tubes to switch the condition of the multivibrator by separate inputs of pulses having the same polarity. Of course, the condition of the multivibrator may be switched by a single input of successive pulses of opposite polarity applied to one of the tubes of the multivibrator.

The output terminal of the gate 21 is connected through a delay circuit 23 to the "shift" input of the register 3, and is also connected directly, together with the output of the shifting register 3, to an amplifier 25. The output of the long pulse generator 5 is applied to a similar amplifier 27, and both amplifiers 25 and 27 are coupled to the transmitter 1. The chief purpose of these amplifiers is to provide isolation, and they may comprise simple cathode follower circuits.

The delay circuit 23 may be designed to provide a delay of 100 microseconds. A suitable circuit for this purpose is a monostable multivibrator arranged to be thrown out of its stable condition by each input pulse, and designed so that it returns to its stable condition after 100 microseconds. This causes the multivibrator to produce a pulse of 100 microseconds' duration. A simple resistance-capacitor circuit is connected to the multivibrator to differentiate the 100 microsecond pulse, thereby producing two short pulses, one at the beginning of the 100 microsecond pulse, and one at the end. Thus the latter short pulse is delayed with respect to the input puulse by the required amount. The circuit is arranged so that the delayed pulse is of the right polarity to "shift" the register 3.

The output of the gate 21 also goes to a pulse counter circuit 29 designed to produce one short output pulse in response to a predetermined number of input pulses, e. g. eight. The counter 29 may be a multivibrator chain, a step-counter, or other known device for this purpose. Its output is supplied to the "close" terminal of the gate 21 to stop the operation of the address system after completion of a calling signal. A possible but not necessarily preferable alternative would be to substitute a delay circuit, like the circuit 23, for the counter 29. In this case the circuit should be designed to provide a delay slightly more than eight pulse periods and somewhat less than nine.

In operation of the above described transmitter station address system, the long pulse generator is set by momentarily closing the switch 15, unless provision is made for resetting it automatically at the end of a message transmission. The address input device 9 is set according to the call assigned to the receiver station, and the set switch 11 is closed momentarily to insert the corresponding binary number pattern in the register 3. Then the start switch 19 is closed. The first pulse produced by the timing signal generator 7, after closure of the switch 19, triggers the long pulse generator 5 and makes it produce a 140 microsecond pulse, see Figs. 2*a* and 2*b*. The long pulse goes through the amplifier 27 to the transmitter 1, and also opens the gate 21, which was previously closed. The next timing pulse, and the seven pulses following it, are passed by the gate 21 and go to the transmitter 1 bay way of the amplifier 25. The output of the gate 21 is shown in Fig. 2*c*. The eighth timing pulse to pass through the gate 21 causes the counter 29 to produce a pulse which closes the gate.

The delay circuit 23 produces eight pulses, each delayed 100 microseconds with respect to the corresponding timing pulse, as shown in Fig. 2*d*. These pulses shift the register 3, making it produce a series of pulses corresponding to the binary designation of the selected address. Fig. 2*e* shows the output of the register 3 when it has been preset to the decimal number fifty-six. The equivalent binary numbers are 0101 and 0110. Each binary digit 1 is represented by an output pulse in response to the shift pulse.

The long pulse (Fig. 2*b*), the gated timing pulses (Fig. 2*c*), and the address pulses (Fig. 2*e*) are combined to provide the composite address signal shown in Fig. 2*f*. This is transmitted to all of a group of receiver stations from which one is to be selected to accept an ensuing message.

The address system of Fig. 1 may be used with any suitable message transmitting system, for example a voice modulation channel. However, it is particularly adaptable to systems that transmit information in code form as groups of binary numbers. A simple message system of this type is shown in Fig. 1. It is assumed that each possible message that the system may be required to transmit can be represented by a respective decimal number. The desired message can be set into a shifting register 33 by a parallel number input switch 35, set switch 37, and a D.-C. source 39, in the same way as the address number is put into the register 3. The message register 33 may be like the address register 3, and include as many stages as are necessary to accommodate the desired number of possible messages. Note that eight stages will provide for 100 messages, twelve stages for 1000, and sixteen stages will allow for ten thousand different messages.

Shifting pulses for the register 33 are supplied from the timing pulse generator 7 through a gate 41. This gate is connected as shown to the counter 29, to be opened at the same time as the gate 21 is closed, namely, at the end of the address signal. The output of the gate 41, besides shifting the message register 33, also goes to a pulse counter 43. The counter 43 may be like the counter 29, but designed to count as many pulses as there are stages in the register 33. The last pulse, coinciding with the end of the message, makes the counter 43 produce an output pulse that is applied to the gate 41 to close it. This pulse may also be applied to the long pulse generator 5 to reset it automatically.

The message pulses shifted out of the register 33 are applied to the transmitter 1 through an isolation amplifier 45, similar to the amplifiers 25 and 27. Thus each time the start switch 19 is closed, the transmitter station sends the preset address signal, followed by the message signal.

Referring to Fig. 3, each receiver station includes an address system, shown in the upper part of the drawing, and a message system, both connected to a receiver-demodulator 51 that is adapted to respond to the transmitter 1. The address system includes a shifting register 53 like the address register 3 at the transmitter station, with a parallel number input circuit 55 including selector switches which may be set to the decimal number representing the particular receiver station. The output of the receiver 51 goes to a gate 57 and to a pulse width discriminator 59. While selector switches are shown, they are not necessary in the receiving stations since each receiving station can be preset and wired to respond to only one address number.

The discriminator 59 is designed, as described hereinafter with reference to Fig. 5, to produce an output pulse only in response to an input pulse of substantially the duration of that provided by the long pulse generator 5 at the transmitter station, e. g. 140 microseconds.

The discriminator 59 is connected to the "open" terminal of the gate 57 and to the "set" terminal of the parallel number input switch 55 of the register 53. The output circuit of the gate 57 is connected to a pulse separator 61, designed to distinguish between the timing pulses and the address pulses on the basis of their relative delays. A suitable circuit for this purpose will be described below with reference to Fig. 7. The pulse separator 61 has two separate output circuits connected to conductors 63 and 65 respectively. The timing pulses appear on conductor 63, which is connected to the "shift" input terminal of the register 53, and to an eight-pulse counter circuit 67, which may be a duplicate of the counter 29 at the transmitting station.

The address pulses from the separator 61 appear on the lead 65. This is connected to one of the two input circuits of a pulse comparator 69. The output circuit of the register 53 is connected to the other input circuit of the comparator 69. The comparator 69 is designed to compare the address signal output of the separator 61 with that of the register 53, pulse by pulse, and to produce no output unless there is a mismatch between the two signals, i. e. if either signal contains a pulse where the other does not. In the event of a mismatch, the comparator 69 produces a pulse. A suitable circuit for the pulse comparator will be described subsequently with reference to Fig. 9.

The output of the eight-pulse counter 67 goes to the "close" terminal of the gate 57, and to the signal input terminal of a gate 71. Even with a mismatch the full eight synchronizing pulses are received by the register 53 so that it is cleared before the gate 57 is closed. The "close" terminal of the gate 71 is connected to the pulse comparator 69, and the "open" terminal is connected to the pulse width discriminator 59.

The message system portion of the receiver station, shown at the bottom of Fig. 3, comprises a gate 73, a delay circuit 75, and a message register and/or indicator 77. The output terminal of the gate 71 is connected to the "open" terminal of the gate 73, and to the delay circuit 75. The circuit 75 may be any suitable means, such as a monostable multivibrator, for producing an output pulse that is delayed by a predetermined interval with respect to an input pulse. It is designed to make the delay interval equal to or somewhat greater than N pulse periods, where N is the number of binary digits per message as sent by the transmitter station. The output of the delay circuit 75 goes to the "close" terminal of the gate 73. The signal input terminal of the gate 73 is connected to the receiver 51, and the output terminal is connected to the register-indicator 77. The latter device may include a cascaded series of bistable multivibrators, like the shifting register 33 at the transmitter station, with the message pulses applied to its serial number input terminal. The read-out or indicator means may comprise simply a number of small neon lamps connected to the respective multivibrator stages, or it may comprise a more elaborate system designed in known manner to convert the binary coded message to a decimal number or other more readily interpretable signal, and display it visually, for example. The device 77 may also include a "clear" input terminal adapted to receive a pulse to remove the previous message from the register in preparation for a new one. This terminal may be connected to the pulse width discriminator 59.

In the operation of the receiver system of Fig. 3, the gating circuits 57 and 73 are initially closed, so that no received signal reaches either the pulse separator 61 or the message register 77. The pulse width discriminator does not respond to pulses that are materially longer or shorter than 140 microseconds. However, when a "long" pulse of the proper length is received, the discriminator opens the gate 57, sets the address register 53, and opens the gate 71, unless it happens to be open already. Fig. 4*a* shows the address signal as received, and Fig. 4*b* represents the output of the discriminator 59.

The timing pulses and address pulses that follow the long pulse go through the gate 57 to the pulse separator 61. Fig. 4*c* shows the timing pulse output of the separator at conductor 63, and Fig. 4*d* shows the address pulse output at conductor 65. In Fid. 4*d* it is assumed that the received address signal is 0101 0110.

The timing pulses shift the register 53, to make it put out pulses corresponding to the address of the receiver station. These pulses are shown in Fig. 4*e*, where it is assumed that the address is 0101 0010, i. e. fifty-two.

The locally produced address pulses and the received address pulses go to the comparator 69. Referring to Figs. 4*d* and 4*e*, it is seen that the first binary digit in both cases is a 0, the second digits are 1, the third digits are 0, and the fourth are 1. Likewise the fifth binary digits in both cases are 0. Since the signals match at each digital order, the comparator produces no output, up to this point. However, the sixth binary digit in the locally produced address group is 0 while that in the received address group is 1. This produces a mismatched condition at the pulse comparator 69 that results in an output pulse, as indicated in Fig. 4*f* of the polarity to close the gate 71, preventing the output pulse from the eight-pulse counter 67 from opening the gate 73. Thus, the mismatch of the local address group and the received address group prevents further information from the receiver 51 from entering the message register 77, so that no message is received by any receiver not set to the proper address.

If the parallel number input switch 55, however, is set at fifty-six, no mismatch is indicated by the pulse comparator 69, and consequently the output of the pulse counter 67 is passed by the gate 71 at the end of the address period so as to open the gate 73 and permit the message from the receiver 51 to be coupled to the message register 77. After the message is received, the delay circuit 75 provides an output pulse which closes the gate 73 so that no further messages can be received on the message register until the proper address is received.

A description of some of the more specialized circuits in the block diagrams of Fig. 3 has been deferred so that the general explanation of the operation of the overall system might be better understood. Three such circuits which are not known to be specifically taught by the prior art are the pulse width discriminator 59, the pulse separator 61, and the pulse comparator 69 of the receiving unit. These individual circuits are set forth in block diagram form in Figs. 5, 7 and 9.

Figure 6:
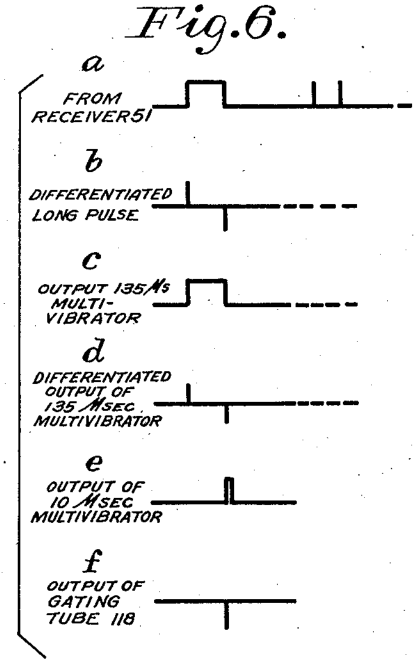
Figure 8:
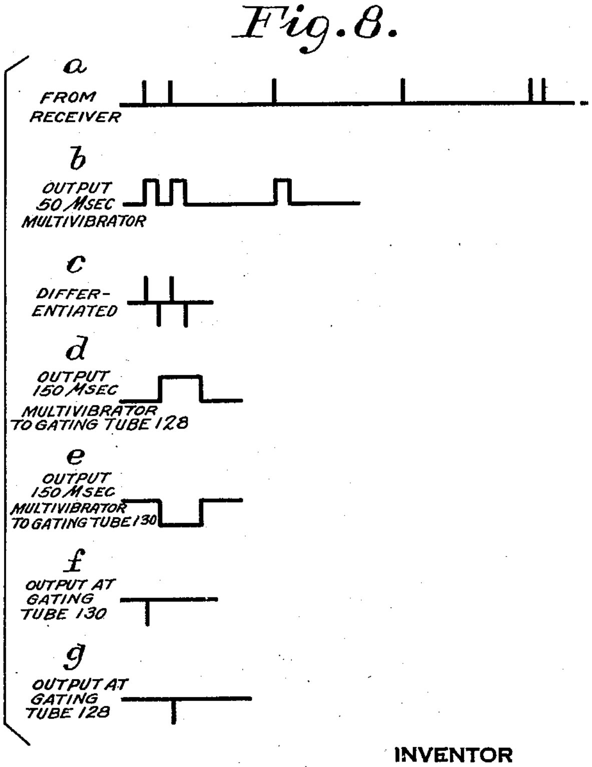

Referring to Fig. 5, which shows the pulse width discriminator circuit, the long pulse from the receiver 51 (as indicated graphically in Fig. 6*a*) is differentiated by an R-C network 100. The differentiated signal includes a positive pulse followed by a negative pulse, corresponding in time respectively to the leading and lagging edges of the long pulse from the receiver, as shown graphically in Fig. 6*b*. A diode 102 couples only the positive pulse from the differentiating circuit 100 to a monostable multivibrator 104 having a 135 microsecond period. The multivibrator 104 when triggered puts out a 135 microsecond pulse as shown in Fig. 6*c*. The negative pulse from the differentiating circuit 100 is coupled by means of a diode 106 to a pulse inverter 108, the pulse inverter providing a short positive output spike corresponding in time to the trailing edge of the pulse from the receiver 51.

The output pulse from the multivibrator 104 is differentiated by an R-C differentiating circuit 110, as shown in Fig. 6*d*. The short negative pulse from the differentiating circuit 110, corresponding in point of time to the trailing edge of the output pulse from the multivibrator 104, is coupled by means of diode 112 to monostable multivibrator 116 having a period of the order of 10 microseconds, see Fig. 6*e*.

The 10 microsecond output pulse of the multivibrator 116 biases a gating tube 118 to conducting condition for the duration of the pulse. Thus, the gating tube 118 is in "open" condition at a time corresponding to the time of the trailing edge of the long pulse from the receiver 51, so that the positive pulse produced by the output of the pulse inverter is passed by the gating tube 118 to provide a negative output pulse from the gating tube 118 at a time corresponding to the trailing edge of the long pulse from the receiver 51, which negative output pulse is applied simultaneously to the gate 57, the parallel number input 55, the pulse discriminator 69, and the "clear" circuit of message register 77.

It will be seen from the above explanation of the pulse width discriminator 59 that the gating tube 118 is held open only for a fixed period from 135 to 145 microseconds after the start of the pulse from the receiver. Discrimination against the address pulses, which are less than 50 microseconds in duration, is achieved by virtue of the fact that the gating tube 118 is not open until 135 microseconds after the pulse is received. Pulses longer than 145 microseconds likewise produce no output from the pulse width discriminator since the gating tube 118 is closed again before the termination of such an extra long pulse.

Once the pulse width discriminator circuit 59 opens the gate 57 and sets the local address from the parallel number input 55 on the shifting register 53, the pulse separator 61 and pulse comparator 69 come into action. The pulse separator circuit is shown in block form in Fig. 7.

The gate 57 having been opened, the address signal from the receiver 51 is coupled to the pulse separator 61. The received address signal is a composite including a series of synchronizing pulses at 500 microsecond intervals with a second pulse following each of the synchronizing pulses by 100 microseconds where a binary digit of 1 is indicated. To separate the synchronizing pulses from the address pulses, the composite signal is applied to a monostable multivibrator 122 having a 50 microsecond period. As shown graphically in Fig. 8*b*, the output of the multivibrator 122 is a succession of 50 microsecond pulses with their leading edges corresponding in time respectively with the synchronizing pulse and the address pulse. The output pulses from the multivibrator 122 are differentiated by the R-C differentiating circuit indicated at 124 and coupled to a monostable multivibrator 126 having a 150 microsecond period. The two sides of the multivibrator 126 are connected respectively to two gating tubes 128 and 130, the multivibrator opening the gating tube 128 and closing the gating tube 130 during the 150 microsecond interval, as indicated graphically in Figs. 8*d* and 8*e*. The gate 130, which is normally open, conducts the first of the positive differentiated output pulses from the multivibrator 122 as coupled by the diode 132, while the gating tube 128, which is normally closed, blocks the synchronizing pulse from the receiver 51. The gating tube 130, however, is closed during the 150 microsecond time interval so that it blocks the differentiated pulse derived from the second or address pulse, while the gating tube 128 passes the address pulse during the 150 microsecond interval. The respective output pulses from the gating tube 130 and gating tube 128 are shown respectively in Figs. 8*f* and 8*g*.

Synchronizing pulses derived from the gating tube 130 are fed to the shifting register 53 (Fig. 3) where they shift out, pulse by pulse, the digital pattern set up by the parallel number input 55, as heretofore explained. The local address pattern from the shifting register 53 is compared with the address pattern from the gating tube 128 of the pulse separator 61 in the pulse comparator 69, a mismatch at any of the digital orders, as a pulse by pulse comparison is made, resulting in an output pulse from the comparator circuit.

As seen in Fig. 9, the pulse comparator circuit includes a monostable multivibrator 134 having a 55 microsecond period. Under matched conditions at a given digital order, a pulse is received from the shifting register 53 followed in 100 microseconds by a matching pulse from the pulse separator 61, or no pulses in a given digital order are received. Under mismatched conditions, a pulse is received from either the shifting register 53 or from the pulse separator 61, but not from both.

Figure 10:
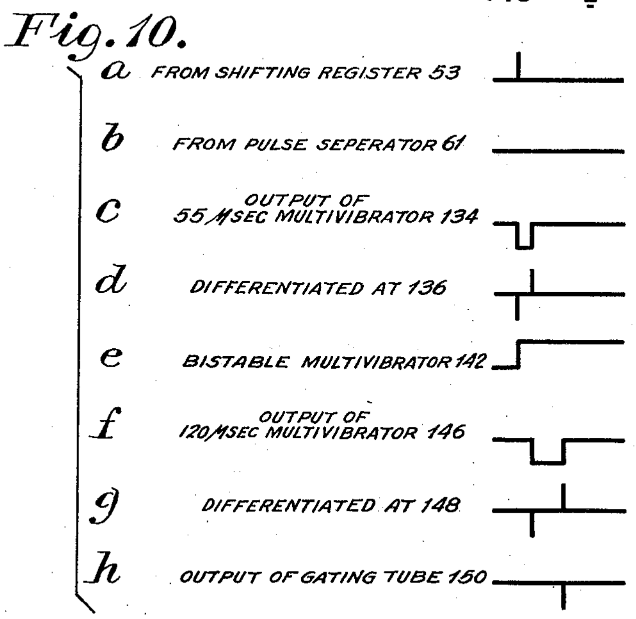

Assuming a mismatched condition, as indicated in the graphical forms of Fig. 10, a pulse may be received from the shifting register 53 with no corresponding pulse from the pulse separator 61, as indicated in Fig. 10*a* and Fig. 10*b* respectively. The pulse from the shifting register triggers the multivibrator 134 producing a 55 microsecond output pulse which is differentiated by the R-C differentiating circuit indicated at 136. The differentiated output is graphically shown in Fig. 10*d*. The differentiated pulse is coupled by a pair of diodes 138 and 140 to the two sides of a bistable multivibrator 142, the diodes being provided to couple only the negative pulse generated by the leading edge of the output pulse from the multivibrator 134 to the multivibrator 142.

As a result of the single negative pulse produced by the differentiation of the single output pulse of the multivibrator 134, the bistable multivibrator 142 changes condition, as shown by Fig. 10*e*. The positive pulse, derived from the trailing edge of the output pulse of the multivibrator 134, is coupled through a diode 144 to a monostable multivibrator 146 having a 120 microsecond period. As shown in Fig. 10*f*, the output of the multivibrator 146 is a 120 microsecond pulse, which is differentiated by the R-C differentiating circuit indicated at 148 and coupled to a gating tube 150 through a diode 152 which only passes the positive portion of the differentiated pulse from the multivibrator 146. The gating tube 150 is biased to the "open" condition by the action of the multivibrator 142, so that the positive portion of the differentiated pulse from the multivibrator 146 is passed by the gating tube 152 under the mismatched conditions as above described, the output of the gating tube 150 being coupled to the gate 71. A connection from the pulse width discriminator 59 to the multivibrator 142 is provided as shown to preset the stable condition of the multivibrator, and to reset the multivibrator after a mismatch.

A mismatched condition between the local address pattern and the address pattern output of the pulse separator also occurs at a digital order in which no pulse is received from the shifting register but a pulse is received from the pulse separator 61. Under such conditions the operation of the pulse comparator is identical to that shown graphically in Fig. 10 except that the outputs of the gating tube 150 and all the other waveforms indicated in Figs. 10*c*–10*g* are delayed by 100 microseconds.

Under matched conditions, that is, where a pulse is received from both the shifting register 53 and the pulse separator 61, the operation of the pulse comparator circuit of Fig. 9 is as follows: The pulse from the shifting register 53, indicated in Fig. 11*a*, triggers the multivibrator 134, producing a 55 microsecond output pulse. One hundred microseconds later a second pulse is received at the multivibrator 134 from the pulse separator 61, which results in a second 55 microsecond output pulse. These two output pulses are indicated in Fig. 11*c* and when differentiated by the differentiating circuit 36, produce a succession of four alternately negative and positive pulses, as shown in Fig. 11*d*. The first negative differentiating pulse switches the condition of the multivibrator 142 while the second negative differentiating pulse, occurring 100 microseconds later, again switches the condition of the multivibrator 142 so that an output pulse of 100 microseconds' duration, as indicated in Fig. 11*e*, is applied to the gating tube 150 by the multivibrator 142. Thus, the gating tube 150 is closed again before the positive portion of the differentiated pulse from the multivibrator 146 is produced, so that there is no output from the gating tube 150 to the gate circuit 71. Thus, it will be seen that an output pulse is produced by the pulse comparator circuit only when a mismatch at any given digital order occurs.

From the above description it will be seen that the various objects of the invention have been achieved by providing a selective communication system in which a digital pattern set up by the transmitter may be used to automatically select any one of a large number of receiver stations, the digital pattern being matched at the receiver to render the receiver receptive to transmitted information only when the proper address pattern is received. By using digital techniques as above described in the address selector system, the receivers are all made identical insofar as component parts are concerned and any one of the receivers can be selected readily from the ground station by simple manual selection up to 100 or even more if so desired.

Such a private line system is particularly suited to airport terminal control for all-weather traffic guidance so that the most efficient use can be made of all airports in a given terminal area. The use of separate communication channels for each aircraft is avoided. Instead one channel may be used for all aircraft with each having its own private line number. Thus, it is possible to select one aircraft from one hundred or more.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An address selector system for a communication network that includes a transmitting station and a plurality of receiving stations, each of said receiving stations being identified by a respective address number, said selector system including, at said transmitting station, a shifting register, means for setting said register to an address number that is to be selected, a timing pulse generator for producing periodic brief pulses, and means including a gate circuit and a delay circuit connected between said pulse generator and said register to apply said pulses to said register to shift said register by one digital step in response to each timing pulse when said gate circuit is in its open condition, the time delay introduced by said delay circuit being substantially less than the period between the output pulses of said pulse generator; a long pulse generator for producing a single non-repetitive long pulse in response to each actuation, said pulse being substantially longer than said timing pulses, and means including a manually operable start switch for actuating said long pulse generator, said long pulse generator being connected to said gate circuit to open said gate circuit at the end of said long pulse; a transmitter having a modulation input terminal coupled to the output terminals of said register, said gate circuit, and said long pulse generator, whereby upon actuation of said start switch, said transmitter sends a composite signal comprising a long pulse followed by a train of timing pulses and a superimposed pulse code representation of the selected address number; each of said receiving stations including a receiver, a shifting register similar to that at the transmitting station, means for setting said receiving station register to the address number of the respective receiving station, means coupling said receiver to said register to shift said register with each received timing pulse, and a pulse comparator coupled to said receiver and to the output terminal of said register, said comparator being adapted to provide an output pulse only in response to a discrepancy between the received address signal and the output of said register; message utilization means, a receiver gate circuit connected between the output of said receiver and said utilization means, said receiver gate circuit having an opening control input circuit coupled to said receiver to open said receiver gate in response to said long pulse, and a closing input terminal connected to said comparator circuit to close said receiver gate in response to an output pulse from said comparator.

2. A system as defined in claim 1 wherein said transmitting station further includes a delay circuit triggered by the first output pulse from said gate circuit, said delay circuit producing a delayed output pulse which is coupled back to said gate circuit to close said gate at the end of a predetermined number of pulses from said pulse generator.

3. A system as defined in claim 1 wherein said means coupling said receiver to said register includes means for separating the timing pulses from the pulse code representation in the address signal, the timing pulses being coupled to said register and the pulse code representation being coupled to said comparator.

4. An address selector system for a communication network that includes a sending station and a plurality of receiving stations, each of said receiving stations being identified by a respective decimal address number, said selector system including at said sending station, a shifting binary number register circuit having a respective group of four digital order stages for each decimal digit of the address numbers with which the system is to be used, means for setting said register with each of said groups of stages containing the binary number equivalent of the respective decimal digit of an address number that is to be selected, a timing pulse generator for producing periodic brief pulses, and means including a gate circuit connected between said pulse generator and said register to apply said pulses to said register to shift said register by one binary step in response to each timing pulse when said gate circuit is in its open condition; a long pulse generator for producing a single non-repetitive pulse in response to each actuation, said pulse being substantially longer than said timing pulses, and means including a manually operable start switch for actuating said long pulse generator, said long pulse generator being connected to said gate to open said gate at the end of said long pulse, the output terminals of said register, said gate circuit, and said long pulse generator being coupled together, whereby upon actuation of said start switch, said sending station sends out a composite signal comprising a long pulse followed by a series of brief pulses corresponding to the timing pulses and binary number pulses of the selected address number; each of said receiving stations including a shifting register, means for setting said register to the address number of the respective receiving station, means for coupling the timing pulses from the sending station to said register to shift said register in response to said series of brief pulses, a pulse comparator coupled to the output terminal of said register, and means for coupling the binary number pulses from the sending station to the comparator, said comparator being adapted to provide an output pulse only in response to a discrepancy between the received address signal and the output of said register; and message utilization means, a gate circuit connecting the signal from the sending station to said message utilization means, said gate circuit having an opening control input terminal to open said gate circuit in response to said long pulse from the sending station, and a closing input terminal connected to said comparator circuit to close said gate circuit in response to an output pulse from said comparator.

5. In a communication network including a transmitting station and a plurality of receiving stations, a system for addressing only particular receiving stations by selection from the transmitting station, said system comprising, at said transmitting station, a timing pulse generator, a transmitter having a modulation input, the timing pulse generator being coupled to the modulation input of the transmitter, a binary shifting register, selector means for setting any one of a number of binary digit code groups on the register, and time delay means for coupling the output of the timing pulse generator to the shifting input of the register, whereby binary digits of the code group are successively shifted out of the register with each delayed timing pulse from the timing pulse generator, the output of the register being coupled to the modulation input of the transmitter; said system further comprising, at each of said receiving stations, a receiver having a demodulation output, a pulse separating circuit for separating the timing pulses from the code group, a binary shifting register, selector means for setting any one of a number of binary code groups on the register, the timing pulses from the pulse separating circuit being coupled to the shifting input of the register, a comparator circuit coupled respectively to the received code group output of the pulse separating circuit and to the local code group output of the register, the comparator circuit producing an output pulse in response to any mismatch between the local and received code groups, and means responsive to the output of the comparator circuit for blocking the output signal from the receiver, whereby only a match between the local and received code groups permits further reproduction of information from the transmitting station by the receiving station.

6. In a communication network including a transmitting station and at least one receiving station, a system for addressing a receiving station from the transmitting station, said system comprising, at said transmitting station, a transmitter having a modulation input, a timing pulse generator coupled to the modulation input of the transmitter, a binary shifting register, selector means for setting any one of the number of binary code groups on the register, and time delay means for coupling the output of the timing pulse generator to the shifting input of the register, whereby successive binary digits in a code group are shifted out of the register with each delayed timing pulse from the timing pulse generator, the output of the register being coupled to the modulation input of the transmitter; said system further comprising, at a receiving station, a receiver having a demodulation output, means for generating in serial form a binary pulse code group representing the address designation of a receiving station, and a comparator circuit coupled respectively to the received code group output derived from the receiver and to the local code group output derived from the register, the comparator circuit producing an output signal indicative of a match or mismatch conditiontion between the received and local code group.

7. In a private line communication system, means for signaling a particular receiving station from a sending station, said means including a timing pulse generator, a shifting register, means for setting any one of a number of binary digit code groups on the register, and time delay means for coupling the output of the pulse generator to the shifting input of the register, whereby the binary digits of the pulse code group are shifted out successively from the register with each delayed timing pulse, the output from the register being coupled to the output of the pulse generator to produce a composite output signal.

References Cited in the file of this patent

UNITED STATES PATENTS

| | | |
|---|---|---|
| 1,665,622 | Chauveau | Apr. 10, 1928 |
| 1,888,904 | Brauer | Nov. 22, 1932 |
| 2,387,444 | Hayslett | Oct. 23, 1945 |
| 2,409,696 | Lewis | Oct. 22, 1946 |
| 2,497,936 | Finch | Feb. 21, 1950 |
| 2,562,176 | Curry | July 31, 1951 |
| 2,601,393 | Hammond | June 24, 1952 |
| 2,626,314 | Coley | Jan. 20, 1953 |
| 2,649,502 | Odell | Aug. 18, 1953 |
| 2,669,706 | Gray | Feb. 16, 1954 |
| 2,670,463 | Raymond et al. | Feb. 23, 1954 |
| 2,677,119 | Luck | Apr. 27, 1954 |